US012528771B2

(12) United States Patent
Otsuka et al.

(10) Patent No.: US 12,528,771 B2
(45) Date of Patent: Jan. 20, 2026

(54) METHOD FOR PRODUCING CENTANAFADINE

(71) Applicant: OTSUKA PHARMACEUTICAL CO., LTD., Tokyo (JP)

(72) Inventors: Rei Otsuka, Osaka (JP); Kimiyoshi Annaka, Osaka (JP); Hikaru Mitani, Osaka (JP)

(73) Assignee: OTSUKA PHARMACEUTICAL CO., LTD., Tokyo (JP)

(*) Notice: Subject to any disclaimer, the term of this patent is extended or adjusted under 35 U.S.C. 154(b) by 939 days.

(21) Appl. No.: 17/769,250

(22) PCT Filed: Oct. 15, 2020

(86) PCT No.: PCT/JP2020/038896
§ 371 (c)(1),
(2) Date: Apr. 14, 2022

(87) PCT Pub. No.: WO2021/075494
PCT Pub. Date: Apr. 22, 2021

(65) Prior Publication Data
US 2024/0140910 A1    May 2, 2024

(30) Foreign Application Priority Data
Oct. 16, 2019    (JP) ................. 2019-189407

(51) Int. Cl.
C07D 209/52    (2006.01)
(52) U.S. Cl.
CPC ................. C07D 209/52 (2013.01)
(58) Field of Classification Search
CPC ........ C07D 209/52; A61P 25/00; A61P 43/00; C07B 2200/13
See application file for complete search history.

(56) References Cited

U.S. PATENT DOCUMENTS 6,364,914 B1    4/2002    Ueda et al.
2001/0011520 A1    8/2001    Ooshima et al.
(Continued)

FOREIGN PATENT DOCUMENTS

JP    H11-267402 A    10/1999
JP    2005-508383 A    3/2005
(Continued)

OTHER PUBLICATIONS

International Search Report and Written Opinion for Application No. PCT/JP2020/038896, dated Dec. 8, 2020.
(Continued)

Primary Examiner — Sarah Pihonak
(74) Attorney, Agent, or Firm — MARSHALL, GERSTEIN & BORUN LLP

(57) ABSTRACT

The present invention addresses the problem of finding a method for reliably producing (1R,5S)-1-(naphthalen-2-yl)-3-azabicyclo[3.1.0]hexane hydrochloride, wherein crystalline polymorphs can be controlled with industrially easy operations. Provided is a method for producing a crystalline form of (1R,5S)-1-(naphthalen-2-yl)-3-azabicyclo[3.1.0] hexane hydrochloride, the method comprising: step (a) for heating and dissolving (1R,5S)-1-(naphthalen-2-yl)-3-azabicyclo[3.1.0]hexane hydrochloride in a solvent including an alcohol-based solvent; step (b) for cooling the dissolved product of step (a) to a temperature, at which crystals of (1R,5S)-1-(naphthalen-2-yl)-3-azabicyclo[3.1.0]hexane hydrochloride precipitate, to nucleate the crystals; step (c) for heating a mixture containing the crystals obtained by nucleation to a temperature at which only a specific crystalline form selectively remains; and step (d) for cooling the mixture heated in step (c) to obtain the crystalline form.

6 Claims, 8 Drawing Sheets

(56) References Cited

U.S. PATENT DOCUMENTS

| | | |
|---|---|---|
| 2005/0043356 A1 | 2/2005 | Alcade et al. |
| 2007/0082940 A1 | 4/2007 | Skolnick et al. |
| 2010/0190827 A1 | 7/2010 | Alcade et al. |
| 2016/0368871 A1 | 12/2016 | Mckinney et al. |
| 2017/0334850 A1 | 11/2017 | Mckinney et al. |
| 2018/0194726 A1 | 7/2018 | Mckinney et al. |
| 2020/0039934 A1 | 2/2020 | Mckinney et al. |
| 2021/0198198 A1 | 7/2021 | Mckinney et al. |

FOREIGN PATENT DOCUMENTS

| | | |
|---|---|---|
| JP | 2018-517742 A | 7/2018 |
| JP | 2019-147794 A | 9/2019 |
| WO | WO-01/14037 A1 | 3/2001 |
| WO | WO-2016/205762 A1 | 12/2016 |
| WO | WO-2018/119291 A1 | 6/2018 |

OTHER PUBLICATIONS

International Preliminary Report on Patentability for Application No. PCT/JP2020/038896, dated Apr. 19, 2022.
Supplementary European Search Report from European Application No. 20875801.1 dated Oct. 12, 2023.
Wu et al., Application of temperature cycling for crystal quality control during crystallization, CrystEngComm, 18:2222-2238 (2016).

METHOD FOR PRODUCING CENTANAFADINE

CROSS-REFERENCE TO RELATED APPLICATIONS

This is a U.S. National Phase of International Application PCT/JP2020/038896, filed Oct. 15, 2020, which claims priority to Japanese Patent Application No. 2019-189407 filed Oct. 16, 2019, the disclosures of which are hereby incorporated by reference herein.

TECHNICAL FIELD

The present invention relates to a process for preparing a crystalline form of (1R,5S)-1-(naphthalen-2-yl)-3-azabicyclo[3.1.0]hexane hydrochloride.

BACKGROUND ART (1R,5S)-1-(Naphthalen-2-yl)-3-azabicyclo[3.1.0]hexane, also known as (+)-1-(naphthalen-2-yl)-3-azabicyclo[3.1.0]hexane (generic name: centanafadine), is a useful compound having inhibitory activity against norepinephrine reuptake, dopamine reuptake, and serotonin (5-HT) reuptake (Patent Literature 1, Patent Literature 2).

Several crystalline forms of (1R,5S)-1-(naphthalen-2-yl)-3-azabicyclo[3.1.0]hexane hydrochloride (also referred to as "Compound 1" hereinafter):

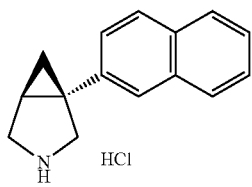

are known as thermodynamically reversibly deformable polymorphs. Crystalline form A is the stable solid phase above the transition temperature $T_{t,B \to A}$; Crystalline form B is the stable solid phase between $T_{t,C \to B}$ and $T_{t,B \to A}$; and Crystalline form C is the stable solid phase below $T_{t,C \to B}$. $T_{t,B \to A}$ is expected between 37 and 54° C., and $T_{t,C \to B}$ is expected below 2° C. Thermodynamically, crystalline form B, which is stable at an ordinary temperature, is a stable crystalline form, whereas crystalline form A persists in the solid state under temperature conditions where it is thermodynamically metastable (Patent Literature 2).

Compound 1 has been prepared in crystalline form A by purification of its crude crystals (Patent Literatures 2, 3, and 4). In order to utilize these methods of purification in an industrial scale, however, there have been problems including difficulty in reproducibility, for example, in that repetitive complex steps of heating, dissolving, and drying with several different types of organic solvents were required; and in that purification from a mixture of crystalline polymorphs having solubility rarely different with each other was difficult.

CITATION LIST

Patent Literature

Patent Literature 1 US 2007/0082940 A1
Patent Literature 2 WO 2016/205762 A1
Patent Literature 3 WO 2018/119291 A1
Patent Literature 4 JP 2019-147794 A

SUMMARY OF INVENTION

Problems to be Solved by the Invention

One object is to find out a process for preparing (1R,5S)-1-(naphthalen-2-yl)-3-azabicyclo[3.1.0]hexane hydrochloride in a stable manner with its crystalline polymorphs controllable by industrially easy operation.

Means of Solving the Problems

After exhaustive consideration and researches, the present inventors found out that crystalline form A of (1R,5S)-1-(naphthalen-2-yl)-3-azabicyclo[3.1.0]hexane hydrochloride may be stably purified by reflux, nucleation, followed by reheating in the purification process of (1R,5S)-1-(naphthalen-2-yl)-3-azabicyclo[3.1.0]hexane hydrochloride, and achieved the present invention.

In one embodiment, provided is a process for preparing crystalline form A of (1R,5S)-1-(naphthalen-2-yl)-3-azabicyclo[3.1.0]hexane hydrochloride, wherein the process comprises:
  step (a) of heating and dissolving (1R,5S)-1-(naphthalen-2-yl)-3-azabicyclo[3.1.0]hexane hydrochloride in a solvent comprising an alcohol-based solvent;
  step (b) of cooling the dissolved product obtained in step (a) to a temperature, at which a crystal of (1R,5S)-1-(naphthalen-2-yl)-3-azabicyclo[3.1.0]hexane hydrochloride precipitates, to nucleate the crystal;
  step (c) of heating a mixture comprising the crystal obtained by nucleation to a temperature at which only a specific crystalline form of the crystal selectively remains; and
  step (d) of cooling the mixture heated in step (c) to obtain the crystalline form.

Effect of the Invention

The present invention allows for preparation of thermodynamically metastable crystalline form A of (1R,5S)-1-(naphthalen-2-yl)-3-azabicyclo[3.1.0]hexane hydrochloride in a reproducible, selective, and stable manner with industrially easy operation wherein (1R,5S)-1-(naphthalen-2-yl)-3-azabicyclo[3.1.0]hexane hydrochloride is heated, nucleated, and reheated under a certain condition.

DESCRIPTION OF EMBODIMENTS

Figure 1:
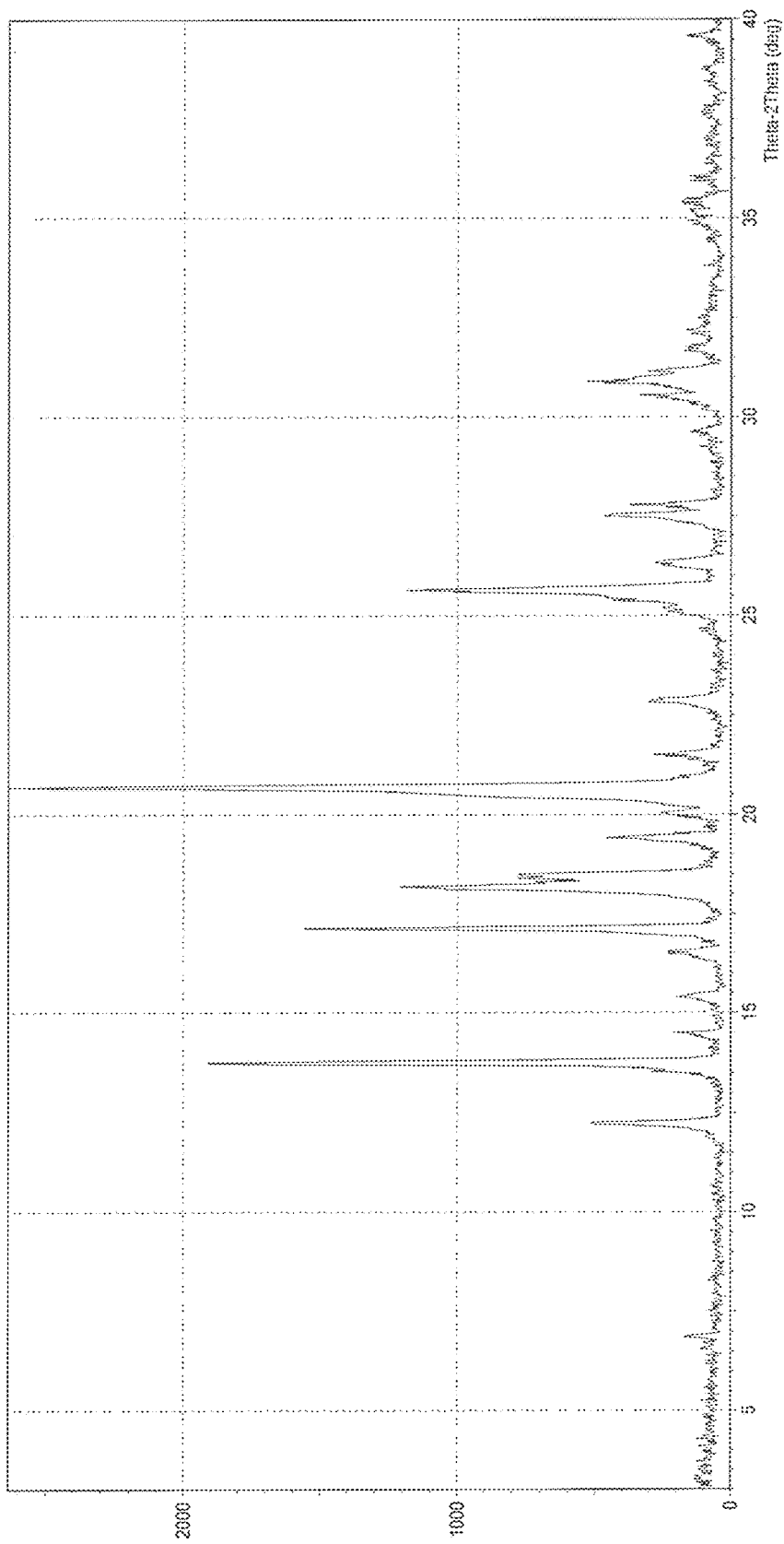
FIG. 1 illustrates XRPD spectral data of the solid obtained in Example 1.

Certain embodiments are illustrated as follows.

Item 1.

A process for preparing crystalline form A of (1R,5S)-1-(naphthalen-2-yl)-3-azabicyclo[3.1.0]hexane hydrochloride, wherein the process comprises:
- step (a) of heating and dissolving (1R,5S)-1-(naphthalen-2-yl)-3-azabicyclo[3.1.0]hexane hydrochloride in a solvent comprising an alcohol-based solvent;
- step (b) of cooling the dissolved product obtained in step (a) to a temperature, at which a crystal of (1R,5S)-1-(naphthalen-2-yl)-3-azabicyclo[3.1.0]hexane hydrochloride precipitates, to nucleate the crystal;
- step (c) of heating a mixture comprising the crystal obtained by nucleation to a temperature at which only a specific crystalline form of the crystal selectively remains in a solid state of the crystalline form; and
- step (d) of cooling the mixture heated in step (c) to obtain the crystalline form.

Item 2.

The process according to Item 1, wherein the temperature for heating in step (a) is a temperature exceeding 77° C.

Item 3.

The process according to Item 1 or 2, wherein the temperature in step (b) ranges from 30° C. to 60° C.

Item 4.

The process according to any one of Items 1 to 3, wherein the temperature in step (c) ranges from 65° C. to below a boiling point of the solvent.

The "alcohol-based solvent" used herein includes methanol, ethanol, propanol, isopropanol, butanol, isobutanol, and a mixed solvent of any two or more of these in arbitrary ratios. Preferably, it is ethanol, isopropanol, or a mixed solvent of ethanol with another alcohol-based solvent. More preferably, it is ethanol.

The "solvent comprising an alcohol-based solvent" used herein is a mixed solvent of an alcohol-based solvent and water in an arbitrary ratio.

The amount of the solvent comprising an alcohol-based solvent used in step (a) is, for example, 8 to 12-fold volume (mL) per the weight (g) of Compound 1. Preferably, it is 10 to 11-fold volume.

The temperature for heating in step (a) refers to a temperature at which the whole of a solvent comprising Compound 1 is refluxed so that Compound 1 in a reaction tank is substantially completely dissolved in the solvent. For example, the temperature is the reflux temperature of a solvent comprising Compound 1. The phrase "Compound 1 is substantially completely dissolved" means that not only Compound 1 in a solvent but also Compound 1 that adheres to the wall of a reaction tank are dissolved. Substantially complete dissolution of Compound 1 can control crystalline forms of Compound 1 in a reproducible manner and reduce the amount of contamination of undesirable crystalline polymorphs. Preferably, the temperature is a temperature exceeding 77° C., and more preferably, it ranges from 79 to 82° C.

The time for heating in step (a) refers to time to substantially complete dissolution of Compound 1 in a reaction tank under reflux of the whole of a solvent comprising Compound 1. The time for heating is, for example, at least 5 minutes. Preferably, it is 10 minutes or more.

The nucleation in step (b) refers to formation of a core of a crystal of Compound 1. The crystal may be any one of crystalline form A, crystalline form B, or crystalline form C of Compound 1 or a mixture of two or more of these crystalline forms in arbitrary ratios. The mixture may comprise, for example, less than 20% by weight, less than 10% by weight, less than 5% by weight, less than 3% by weight, less than 2% by weight, less than 1% by weight, less than 0.1% by weight, or less than 0.01% by weight, of any of the crystalline forms to a major crystalline form.

The temperature at which a crystal precipitates in step (b) refers to a temperature at which a crystal of Compound 1, preferably a crystal comprising crystalline form A of Compound 1, precipitates. The temperature ranges, for example, from 20 to 60° C. It is preferably 30 to 60° C. More preferably, it is 60° C.

The time for cooling in step (b) is, for example, 10 minutes or more. Preferably, it is 40 minutes or more.

The temperature at which only a specific crystalline form selectively remains in a solid state of the crystalline form in step (c) is preferably a temperature at which crystalline form A of Compound 1 selectively remains in the solid state and crystalline forms of Compound 1 other than the crystalline form A substantially completely dissolve. In one embodiment, the temperature at which only a specific crystalline form selectively remains in the solid state is a temperature at which a specific crystalline form may comprise, for example, less than 5% by weight, less than 3% by weight, less than 2% by weight, less than 1% by weight, less than 0.1% by weight, or less than 0.01% by weight, of any of other crystalline forms to a major crystalline form. The temperature ranges, for example, from 65° C. to below a boiling point of a solvent comprising an alcohol-based solvent. Preferably, the temperature ranges from 65° C. to 72° C. More preferably, it is 70° C.

The time for heating in step (c) refers to time for substantially complete dissolution of crystalline forms of Compound 1 other than crystalline form A. The time ranges, for example, from 30 minutes to less than 10 hours. Preferably, it ranges from 60 minutes to 7 hours.

The temperature for cooling in step (d) ranges, for example, from 0 to 20° C. Preferably, it is 10° C.

The time for cooling in step (d) is, for example, 2 to 12 hours.

Figure 2:
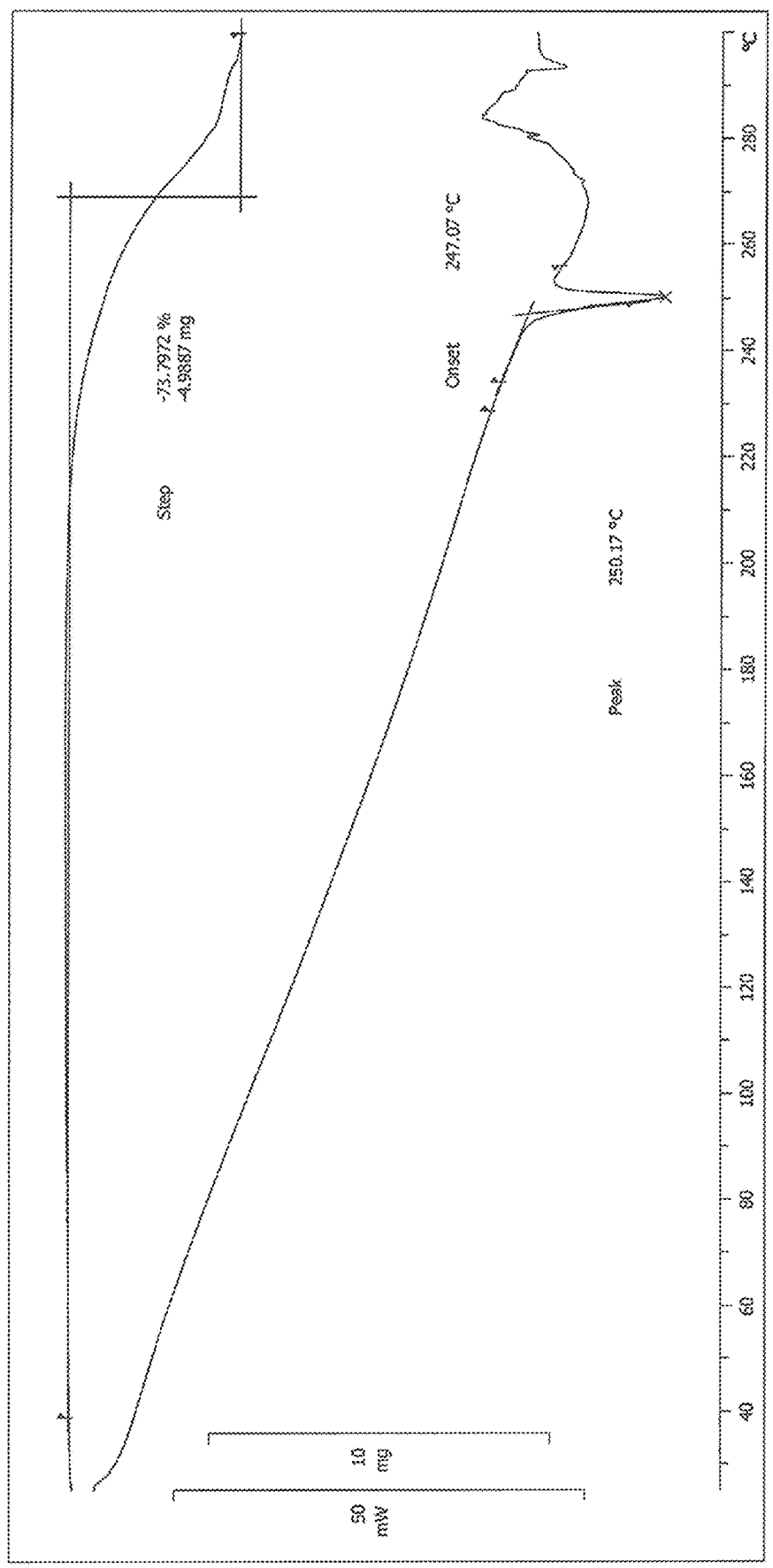
FIG. 2 illustrates TGA/DSC spectral data of the solid obtained in Example 1.
Figure 3:
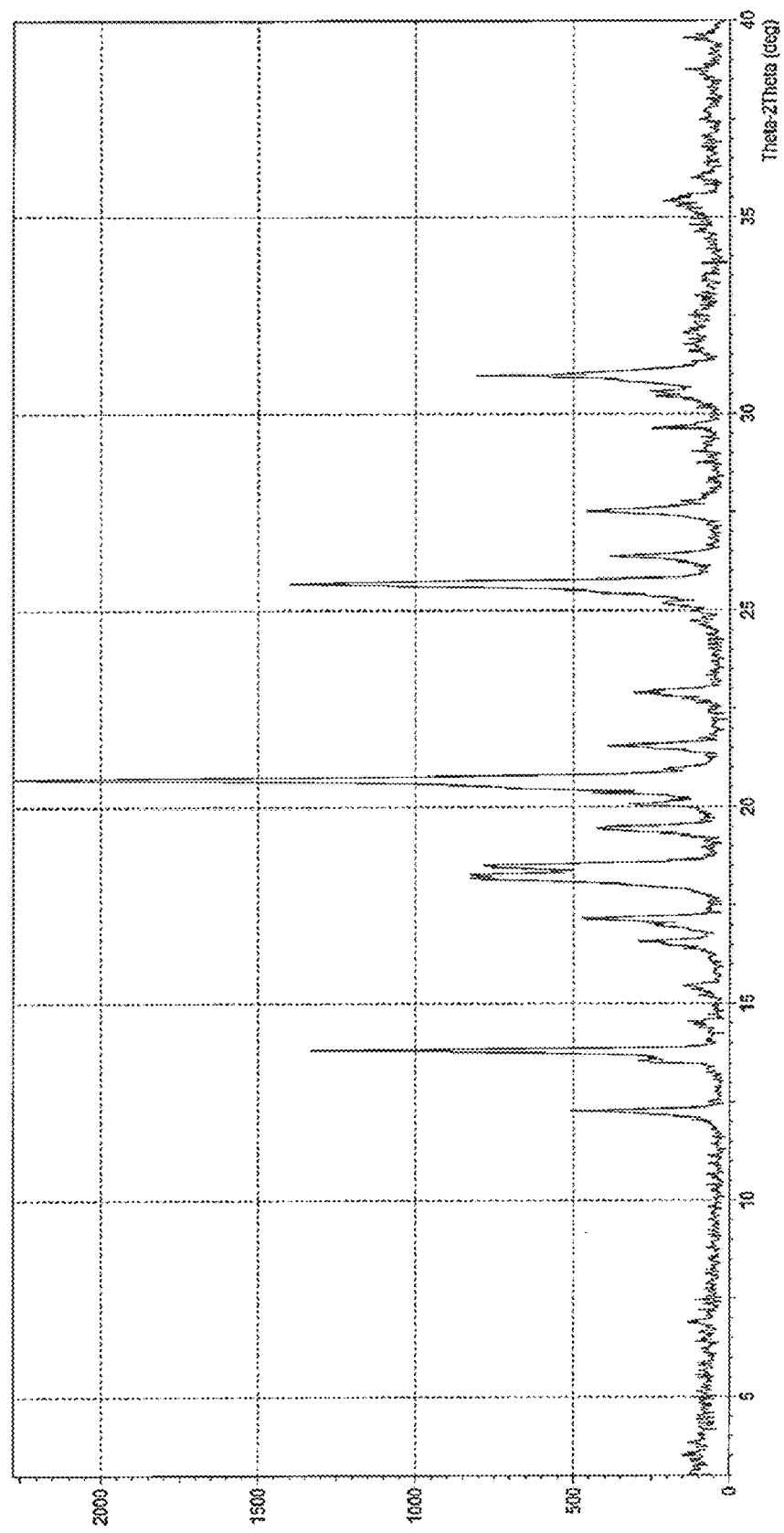
FIG. 3 illustrates XRPD spectral data of the solid obtained in Example 2.
Figure 4:
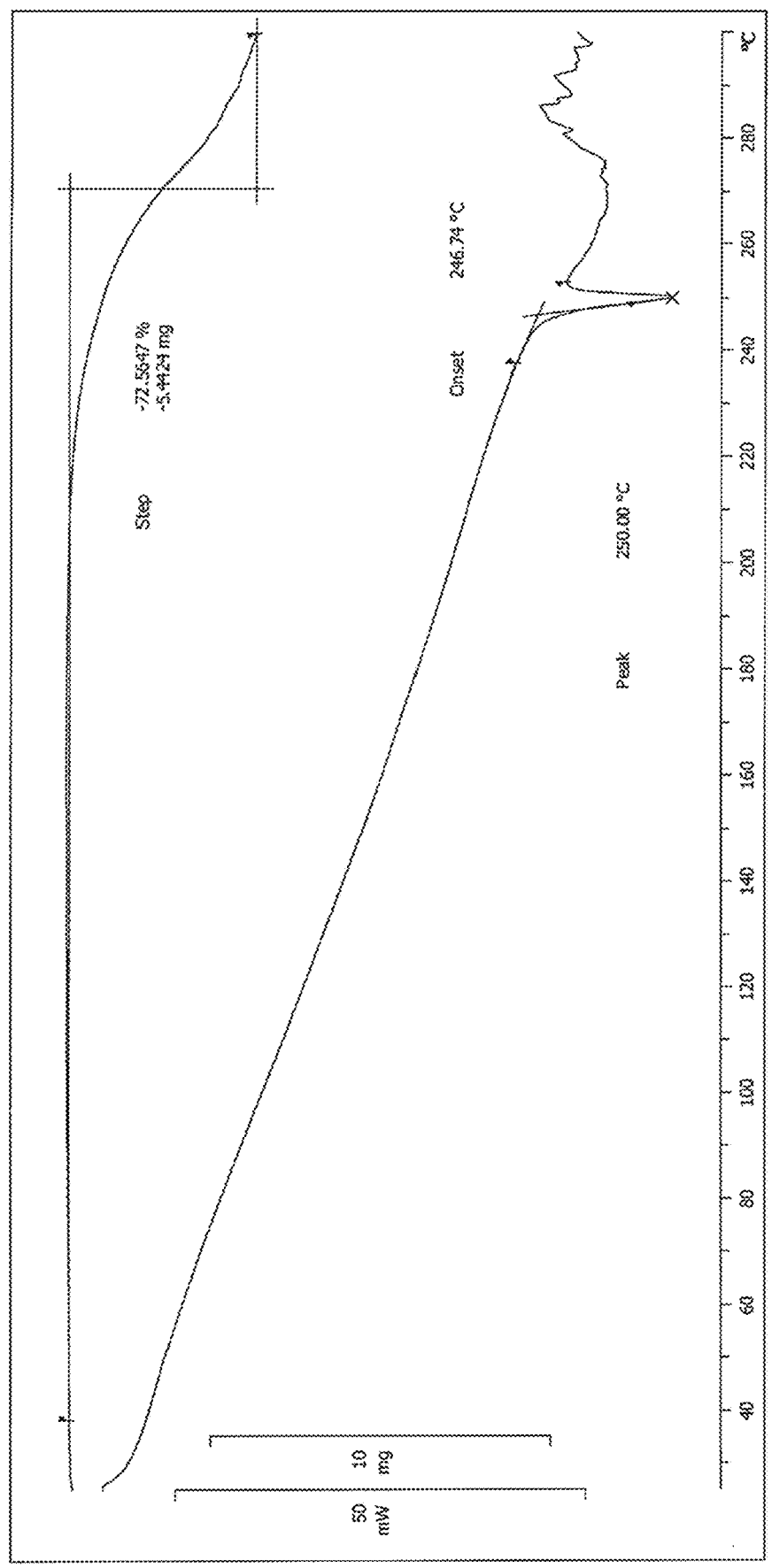
FIG. 4 illustrates TGA/DSC spectral data of the solid obtained in Example 2.
Figure 5:
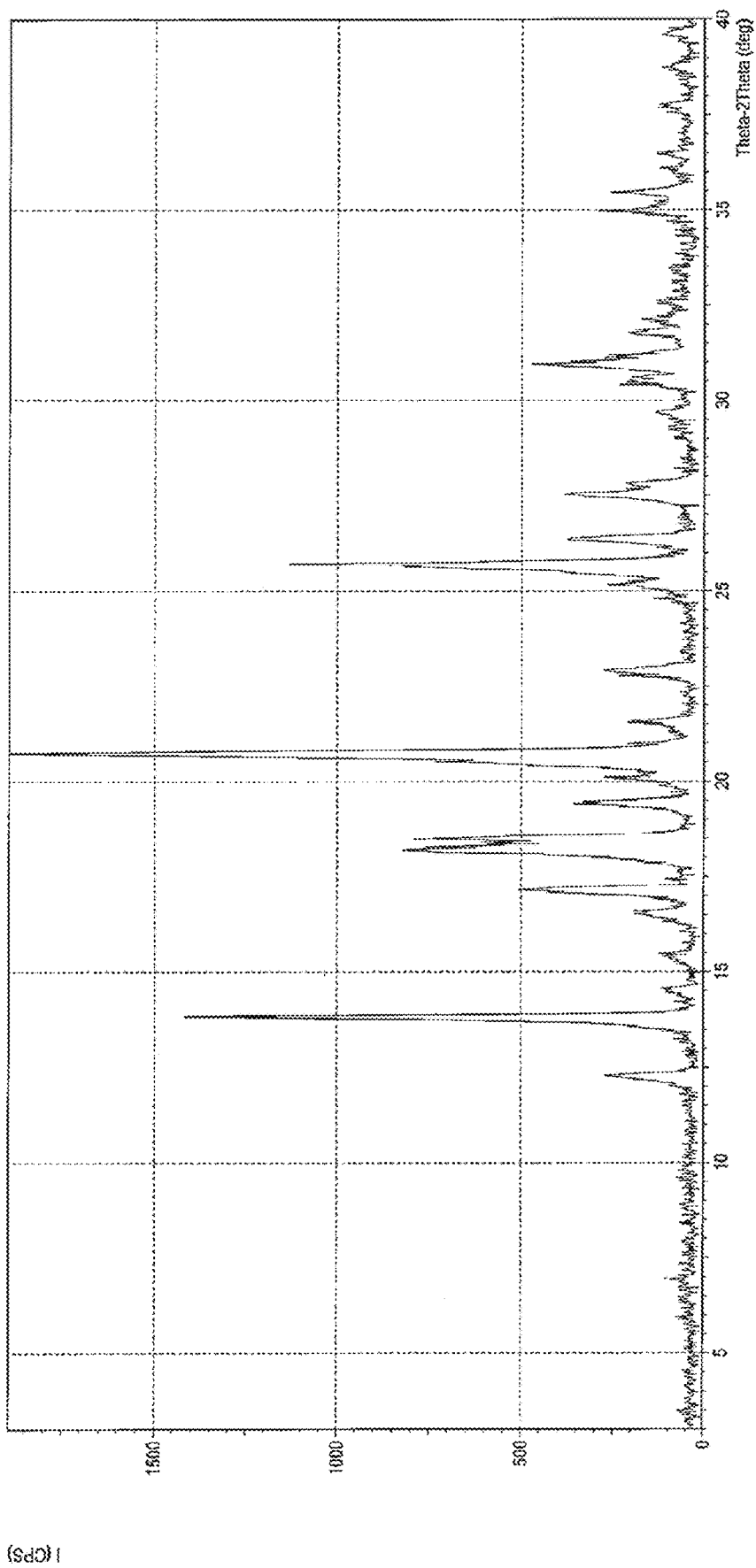
FIG. 5 illustrates XRPD spectral data of the solid obtained in Example 3.
Figure 6:
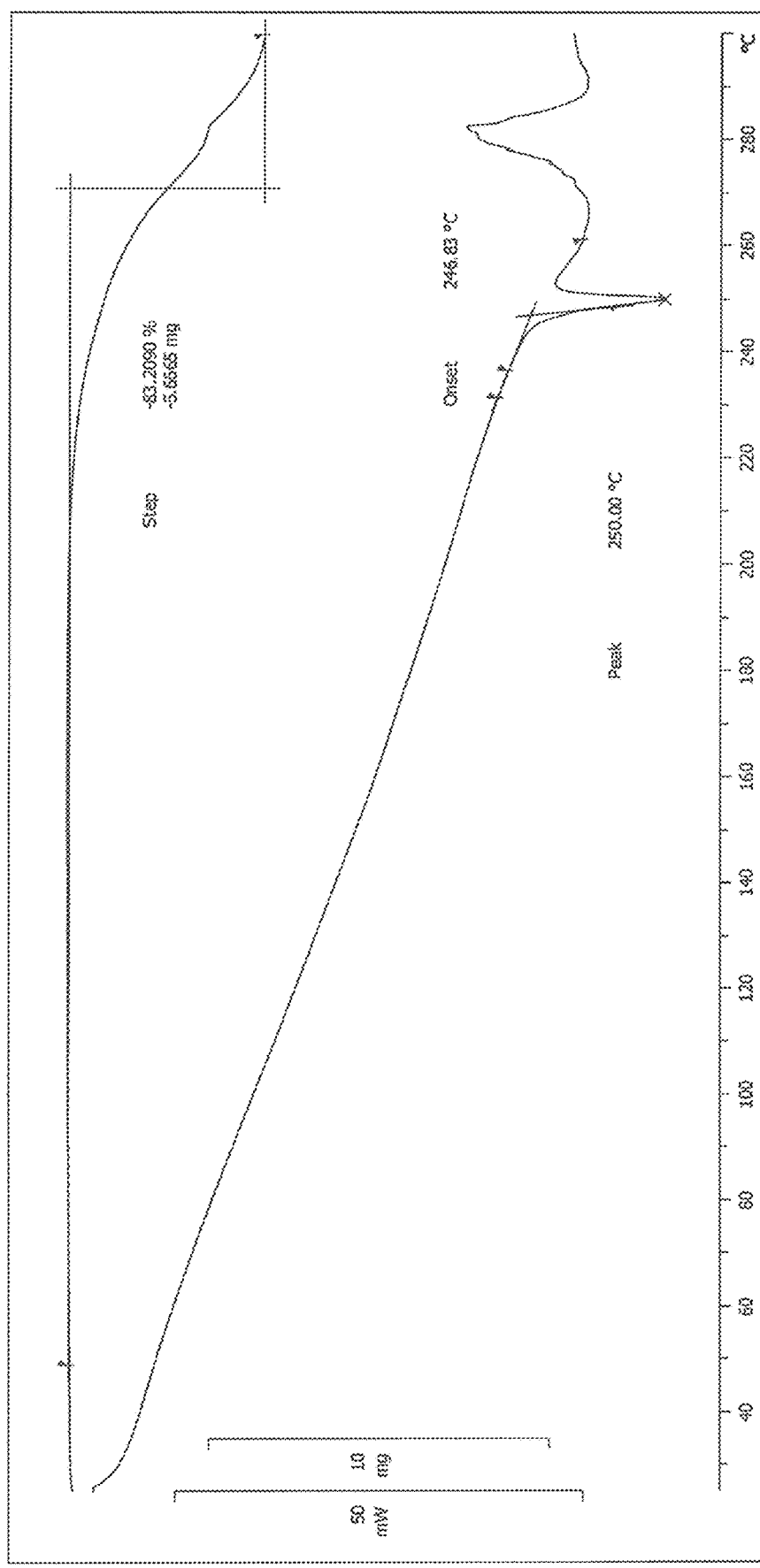
FIG. 6 illustrates TGA/DSC spectral data of the solid obtained in Example 3.
Figure 7:
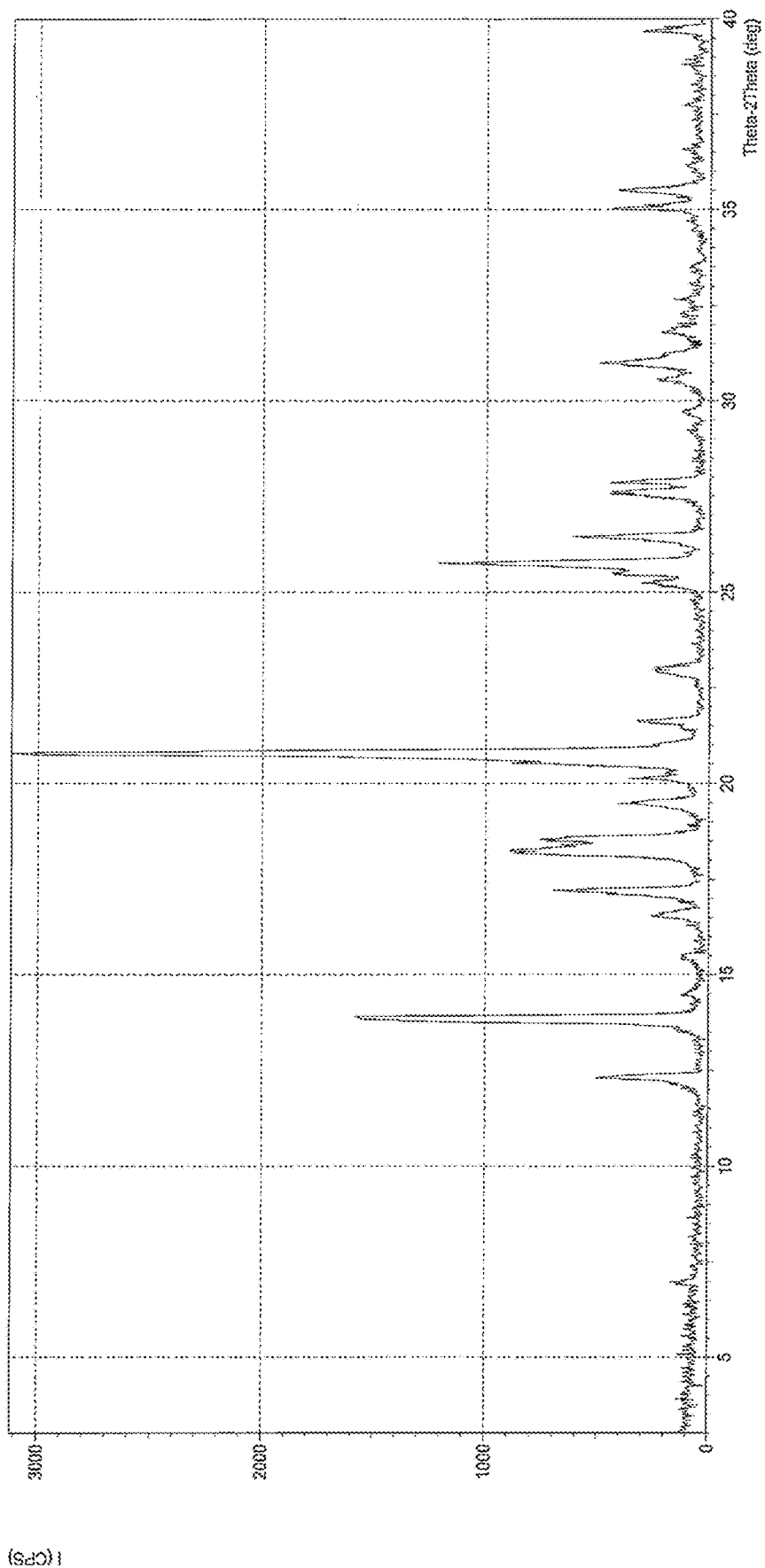
FIG. 7 illustrates XRPD spectral data of the solid obtained in Example 4.
Figure 8:
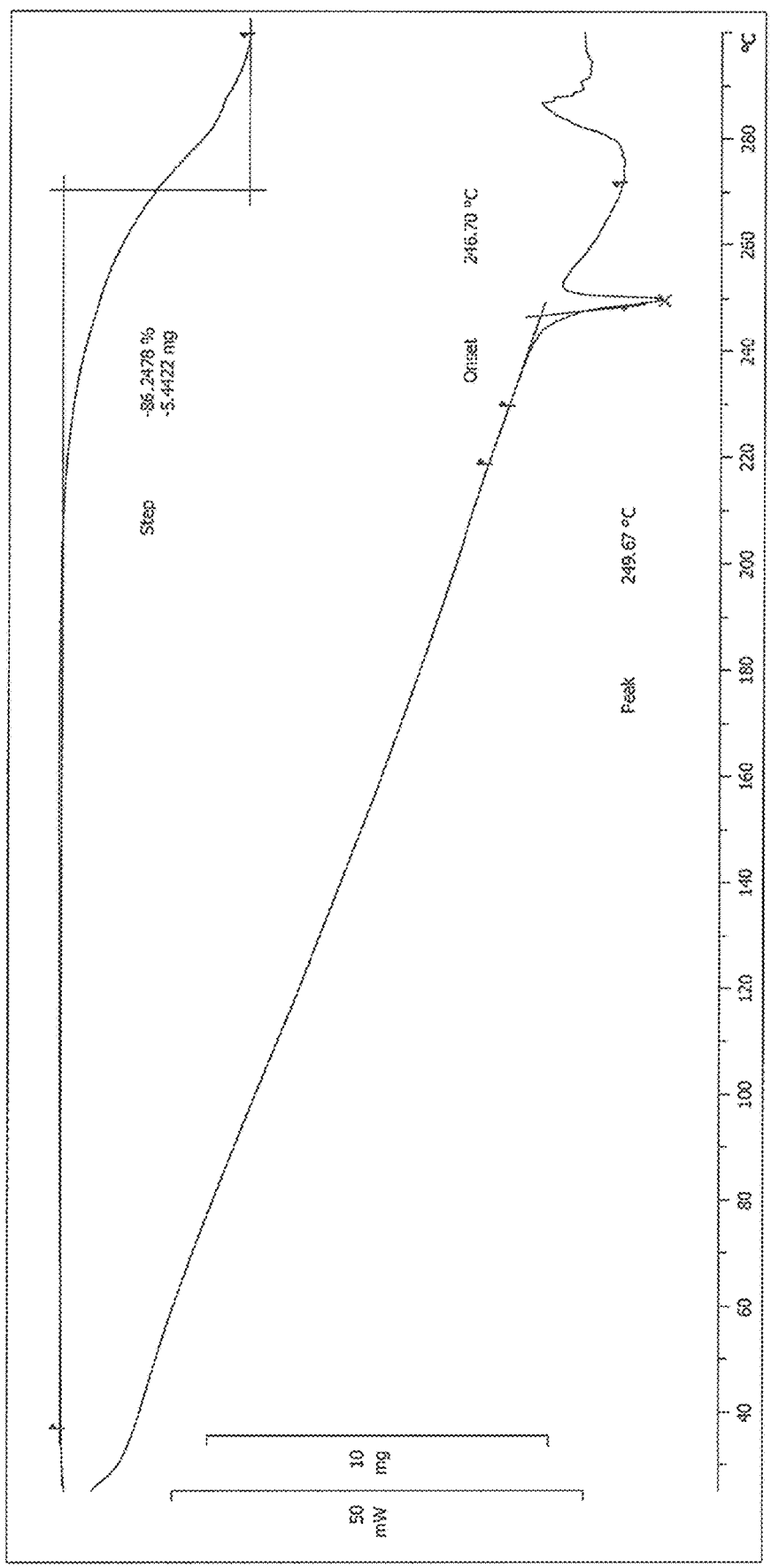
FIG. 8 illustrates TGA/DSC spectral data of the solid obtained in Example 4.

Crystalline form A may exhibit at least three, e.g., at least five, e.g., at least seven, e.g., at least nine, 2θ values selected from the group consisting of 12.22±0.2°, 13.75±0.2°, 15.38±0.2°, 16.51±0.2°, 17.11±0.2°, 18.46±0.2°, 19.40±0.2°, 20.44±0.2°, 20.65±0.2°, 22.85±0.2°, and 25.62±0.2° in X-ray powder diffractometry (XRPD) using Cu radiation. In one embodiment, crystalline form A substantially exhibits an XRPD pattern of FIG. 1, FIG. 3, FIG. 5, or FIG. 7. Crystalline form A may also exhibit an onset temperature of an endothermic peak of, for example, 247.07±1.0° C. in thermogravimetric analysis and differential scanning calorimetry (TGA/DSC). In one embodiment, crystalline form A substantially exhibits a TGA/DSC pattern of FIG. 2, FIG. 4, FIG. 6, or FIG. 8.

Crystalline form B of Compound 1 which can be formed in the nucleation of step (b) may also be prepared by, for example, the method disclosed in Patent Literature 2, and may exhibit any one of XRPD patterns or TGA/DSC patterns of crystalline form B described in that literature.

Crystalline form C of Compound 1 which can be formed in the nucleation of step (b) may also be prepared by, for example, the method disclosed in Patent Literature 2, and may exhibit any one of XRPD patterns or TGA/DSC patterns of crystalline form C described in that literature.

Process for Preparing Crystalline Form A

A crude product of Compound 1 may be prepared by any one of the methods disclosed in Patent Literatures 2 to 4.

A crude product of Compound 1 is heated and dissolved in a solvent comprising an alcohol-based solvent, and then cooled and reheated after addition of activated carbons. The mixture was filtered while hot, and then the activated carbons on the filter are washed with the solvent comprising an alcohol-based solvent. The resulted filtrate is heated until Compound 1 is substantially completely dissolved, and then the filtrate is cooled to a temperature at which a crystal of Compound 1 precipitates. Then, the mixture is reheated and stirred. After cooling the mixture to precipitate a crystal, the precipitated crystal is filtered and washed with an alcohol-based solvent, and dried to give crystalline form A of Compound 1.

EXAMPLES

The present invention is illustrated with examples in more detail as below, but is not intended to be limited thereto. The following are measurement conditions of analytical instruments used in examples.
1. Chemical Purity Test by HPLC
   Column: Kinetex® Polar C18 (100 mm×3.0 mm, 2.6 µm)(Phenomenex®)
   Column temperature: 40° C.
   Wave length: 254 nm
   Mobile phase:
       Solution A: acetonitrile
       Solution B: 20 mM aqueous ammonium formate solution
   Composition:

| Time (min) | Solution A (%) | Solution B (%) |
|---|---|---|
| 0 | 10 | 90 |
| 8 | 40 | 60 |
| 12 | 80 | 20 |
| 15 | 80 | 20 |
| 15.1 | 10 | 90 |
| 18 | 10 | 90 |

Flow rate: 0.8 mL/min
   Injection volume: 5 µL
2. Optical Purity Test by HPLC
   Column: Shiseido chiral CD-Ph (250 mm×4.6 mm, 5 µm)
   Column temperature: 30° C.
   Wave length: 222 nm
   Mobile phase: 50 mmol/L sodium heptanesulfonate buffer (pH 3.0)/acetonitrile mixture (6:4)
   Flow rate: 1.5 mL/min
   Injection volume: 5 µL
3. X-Ray Powder Diffraction Measurement (XRPD)
   Measuring instrument manufacturer (Model): Shimadzu Corporation (XRD-6000)
   Radiation source: Cu
   Voltage/current: 35 kV/20 mA
   Measurement range: 2θ, 3 to 40°
   Measuring rate: 5°/min
4. Thermogravimetric Analysis and Differential Scanning Calorimetry (TGA/DSC)

Measuring instrument manufacturer (Model): Mettler Toledo (TGA/DSC1)
Heating rate: 5° C./min
Temperature range: 25 to 300° C.
Atmosphere gas: dry nitrogen
Flow rate: 50 mL/min
Sample 6.7600 mg
Result Mode: Abscissa Unit Example 1

Preparation of crystalline form A of (1R,5S)-1-(naphthalen-2-yl)-3-azabicyclo[3.1.0]hexane hydrochloride (Compound 1)

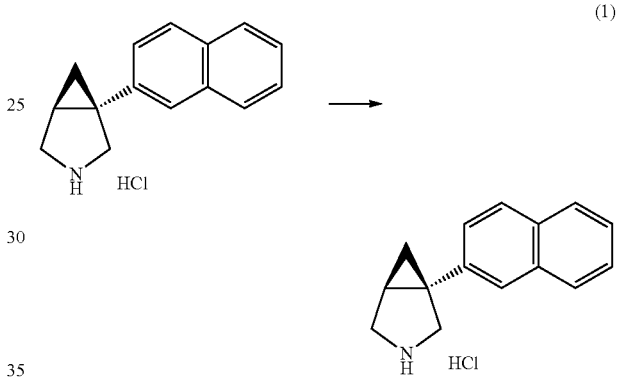

A crude product of (1R,5S)-1-(naphthalen-2-yl)-3-azabicyclo[3.1.0]hexane hydrochloride (20.0 g, 0.081 mol) was added to a mixture of ethanol (178.2 mL) and water (1.8 mL) under nitrogen atmosphere. The mixture was refluxed for over 10 minutes to dissolve the crude product. The solution was left to stand to cool until the reflux stopped. Activated carbons (2.0 g) were added to the solution, and the mixture was refluxed for over 30 minutes. The mixture was filtered while hot, and then the activated carbons on the filter were washed with a mixture of ethanol (19.8 mL) and water (0.2 mL). The filtrate was refluxed again for over 10 minutes (79° C.) to completely dissolve the filtrate. The resultant solution was cooled to 60° C., and then reheated to 70° C. The mixture was then stirred at 70° C. for over 60 minutes. The mixture was cooled to 10° C. to precipitate a crystal, and then the precipitated crystal was filtered, washed with ethanol (40.0 mL), and dried at 40° C. to give the title compound as a white to pale yellow solid (14.80 g, yield 74.00%, chemical purity 99.65%, optical purity 100.00% ee).

$^1$H-NMR (400 MHz, DMSO-$d_6$) δ: 1.22-1.23 (1H, m), 1.45-1.48 (1H, m), 2.23-2.24 (1H, m), 3.41-3.43 (1H, m), 3.51-3.52 (1H, m), 3.58-3.61 (1H, m), 3.76-3.79 (1H, m), 7.39 (1H, dd, J=1.8, 8.2 Hz), 7.49 (1H, ddd, J=1.4, 6.9, 6.9 Hz), 7.51 (1H, ddd, J=1.4, 6.9, 6.9 Hz), 7.82 (1H, d, J=1.8 Hz), 7.88 (2H, dd, J=1.4, 6.9 Hz), 7.89 (1H, d, J=8.2 Hz), 9.71 (2H, br.s)

The resulted solid was measured for XRPD and TGA/DSC and confirmed to be crystalline form A. The results are shown in the following table and FIGS. 1 and 2.

| Analysis | Results |
| --- | --- |
| XRPD | 2θ = 12.22°, 13.75°, 15.38°, 16.51°, 17.11°, 18.46°, 19.40°, 20.44°, 20.65°, 22.85°, 25.62° |
| TGA/DSC | Onset 247.07° C. |

Example 2

Preparation of crystalline form A of (1R,5S)-1-(naphthalen-2-yl)-3-azabicyclo[3.1.0]hexane hydrochloride (Compound 1)

(2)

A crude product of (1R,5S)-1-(naphthalen-2-yl)-3-azabicyclo[3.1.0]hexane hydrochloride (20.0 g, 0.081 mol) was added to a mixture of ethanol (178.2 mL) and water (1.8 mL) under nitrogen atmosphere. The mixture was refluxed for over 10 minutes to dissolve the crude product. The solution was left to stand to cool until the reflux stopped. Activated carbons (2.0 g) were added to the solution, and the mixture was refluxed for over 30 minutes. The mixture was filtered while hot, and then the activated carbons on the filter were washed with a mixture of ethanol (19.8 mL) and water (0.2 mL). The filtrate was refluxed again for over 10 minutes (79° C.) to completely dissolve the filtrate. The resultant solution was cooled to 51° C., and then reheated to 70° C. The mixture was then stirred at 70° C. for over 60 minutes. The mixture was cooled to 10° C. to precipitate a crystal, and then the precipitated crystal was filtered, washed with ethanol (40.0 mL), and dried at 40° C. to give the title compound as a white to pale yellow solid (14.55 g, yield 72.75%, chemical purity 100.00%, optical purity 99.81% ee).

$^1$H-NMR (400 MHz, DMSO-$d_6$) δ: 1.22-1.23 (1H, m), 1.45-1.48 (1H, m), 2.23-2.24 (1H, m), 3.41-3.43 (1H, m), 3.51-3.52 (1H, m), 3.58-3.61 (1H, m), 3.76-3.79 (1H, m), 7.39 (1H, dd, J=1.8, 8.2 Hz), 7.49 (1H, ddd, J=1.4, 6.9, 6.9 Hz), 7.51 (1H, ddd, J=1.4, 6.9, 6.9 Hz), 7.82 (1H, d, J=1.8 Hz), 7.88 (2H, dd, J=1.4, 6.9 Hz), 7.89 (1H, d, J=8.2 Hz), 9.71 (2H, br.s)

The resulted solid was measured for XRPD and TGA/DSC and confirmed to be crystalline form A. The results are shown in the following table and FIGS. 3 and 4.

| Analysis | Results |
| --- | --- |
| XRPD | 2θ = 12.26°, 13.80°, 15.39°, 16.53°, 17.13°, 18.48°, 19.43°, 20.46°, 20.68°, 22.89°, 25.65° |
| TGA/DSC | Onset 246.74° C. |

Example 3

Preparation of crystalline form A of (1R,5S)-1-(naphthalen-2-yl)-3-azabicyclo[3.1.0]hexane hydrochloride (Compound 1)

(3)

A crude product of (1R,5S)-1-(naphthalen-2-yl)-3-azabicyclo[3.1.0]hexane hydrochloride (20.0 g, 0.081 mol) was added to a mixture of ethanol (178.2 mL) and water (1.8 mL) under nitrogen atmosphere. The mixture was refluxed for over 10 minutes to dissolve the crude product. The solution was left to stand to cool until the reflux stopped. Activated carbons (2.0 g) were added to the solution, and the mixture was refluxed for over 30 minutes. The mixture was filtered while hot, and then the activated carbons on the filter were washed with a mixture of ethanol (19.8 mL) and water (0.2 mL). The filtrate was refluxed again for over 10 minutes (79° C.) to completely dissolve the filtrate. The resultant solution was cooled to 60° C., and then reheated to 72° C. The mixture was then stirred at 72° C. for over 60 minutes. The mixture was cooled to 10° C. to precipitate a crystal, and then the precipitated crystal was filtered, washed with ethanol (40.0 mL), and dried at 40° C. to give the title compound as a white to pale yellow solid (12.69 g, yield 63.45%, chemical purity 100.00%, optical purity 99.78% ee).

$^1$H-NMR (400 MHz, DMSO-$d_6$) δ: 1.22-1.23 (1H, m), 1.45-1.48 (1H, m), 2.23-2.24 (1H, m), 3.41-3.43 (1H, m), 3.51-3.52 (1H, m), 3.58-3.61 (1H, m), 3.76-3.79 (1H, m), 7.39 (1H, dd, J=1.8, 8.2 Hz), 7.49 (1H, ddd, J=1.4, 6.9, 6.9 Hz), 7.51 (1H, ddd, J=1.4, 6.9, 6.9 Hz), 7.82 (1H, d, J=1.8 Hz), 7.88 (2H, dd, J=1.4, 6.9 Hz), 7.89 (1H, d, J=8.2 Hz), 9.71 (2H, br.s)

The resulted solid was measured for XRPD and TGA/DSC and confirmed to be crystalline form A. The results are shown in the following table and FIGS. 5 and 6.

| Analysis | Results |
| --- | --- |
| XRPD | 2θ = 12.30°, 13.83°, 15.43°, 16.56°, 17.17°, 18.54°, 19.47°, 20.48°, 20.75°, 22.93°, 25.75° |
| TGA/DSC | Onset 246.83° C. |

Example 4

Preparation of crystalline form A of (1R,5S)-1-(naphthalen-2-yl)-3-azabicyclo[3.1.0]hexane hydrochloride (Compound 1)

(4)

A crude product of (1R,5S)-1-(naphthalen-2-yl)-3-azabicyclo[3.1.0]hexane hydrochloride (20.0 g, 0.081 mol) was added to a mixture of isopropanol (190.0 mL) and water (10.0 mL) under nitrogen atmosphere. The mixture was refluxed for over 10 minutes to dissolve the crude product. The solution was left to stand to cool until the reflux stopped. Activated carbon (2.0 g) were added to the solution, and the mixture was refluxed for over 30 minutes. The mixture was filtered while hot, and then the activated carbons on the filter were washed with a mixture of isopropanol (19.0 mL) and water (1.0 mL). The filtrate was refluxed again for over 10 minutes (82° C.) to completely dissolve the filtrate. The resultant solution was cooled to 30° C., and then reheated to 66° C. The mixture was then stirred at 66° C. for over 60 minutes. The mixture was cooled to 10° C. to precipitate a crystal, and then the precipitated crystal was filtered, washed with isopropanol (40.0 mL), and dried at 40° C. to give the title compound as a white to pale yellow solid (13.46 g, yield 67.30%, chemical purity 100.00%, optical purity 99.62% ee).

$^1$H-NMR (400 MHz, DMSO-$d_6$) δ: 1.22-1.23 (1H, m), 1.45-1.48 (1H, m), 2.23-2.24 (1H, m), 3.41-3.43 (1H, m), 3.51-3.52 (1H, m), 3.58-3.61 (1H, m), 3.76-3.79 (1H, m), 7.39 (1H, dd, J=1.8, 8.2 Hz), 7.49 (1H, ddd, J=1.4, 6.9, 6.9 Hz), 7.51 (1H, ddd, J=1.4, 6.9, 6.9 Hz), 7.82 (1H, d, J=1.8 Hz), 7.88 (2H, dd, J=1.4, 6.9 Hz), 7.89 (1H, d, J=8.2 Hz), 9.71 (2H, br.s)

The resulted solid was measured for XRPD and TGA/DSC and confirmed to be crystalline form A. The results are shown in the following table and FIGS. 7 and 8.

| Analysis | Results |
|---|---|
| XRPD | 2θ = 12.25°, 13.80°, 15.38°, 16.49°, 17.12°, 18.50°, 19.42°, 20.42°, 20.70°, 22.85°, 25.66° |
| TGA/DSC | Onset 246.70° C. |

Reference Example 1

A crude product of (1R,5S)-1-(naphthalen-2-yl)-3-azabicyclo[3.1.0]hexane hydrochloride (16.0 g, 0.065 mol) was added to a mixture of ethanol (198.0 mL) and water (2.0 mL) under nitrogen atmosphere. The mixture was refluxed for over 10 minutes (79° C.) to completely dissolve the crude product. The solution was cooled to 60° C., and crystalline form A (4.0 g) was added thereto. The mixture was then reheated to 70° C. and stirred at 70° C. for 60 minutes. The mixture was cooled to 10° C. to precipitate a crystal, and then the precipitated crystal was filtered, washed with ethanol (40.0 mL), and dried at 40° C. to give a white solid (yield 78.1%, chemical purity 99.94%, optical purity 99.99% ee).

Changes of crystal habit and particle size were observed with Particle View (PVM V819; Mettler Toledo) and Particle track (FBRM G400; Mettler Toledo) from start of the reaction to filtration of the crystal.

The crystal remained at the time that the mixture was reheated to 70° C., and no change of the crystal habit or the particle size was observed during stirring at 70° C. for 60 minutes. No transition of crystalline forms was observed. The solid obtained after purification was measured for XRPD and confirmed to be crystalline form A.

Reference Example 2

A crude product of (1R,5S)-1-(naphthalen-2-yl)-3-azabicyclo[3.1.0]hexane hydrochloride (16.0 g, 0.065 mol) was added to a mixture of ethanol (198.0 mL) and water (2.0 mL) under nitrogen atmosphere. The mixture was refluxed for over 10 minutes (79° C.) to completely dissolve the crude product. The solution was cooled to 60° C., and crystalline form B (4.0 g) was added thereto. The mixture was then reheated to 70° C. and stirred at 70° C. for 60 minutes. The resultant solution was cooled to 10° C. to precipitate a crystal, and then the precipitated crystal was filtered, washed with ethanol (40.0 mL), and dried at 40° C. to give a white solid (yield 76.5%, chemical purity 99.95%, optical purity 100% ee).

Changes of crystal habit and particle size were observed with Particle View (PVM V819; Mettler Toledo) and Particle track (FBRM 6400; Mettler Toledo) from start of the reaction to filtration of the crystal.

At the time that crystalline form B was added, a plate-like crystalline form B which was not so thick as a pillared crystalline form A was observed. At the time that the mixture was reheated to 70° C., the crystal was completely dissolved and was not observed. Right before the filtration of the precipitated crystal after cooling to 10° C., a pillared crystalline form A was observed. The solid obtained after purification was measured for XRPD and confirmed to be crystalline form A.

Crystalline form B added in Reference Example 2 was obtained in the following manner.

Crystalline form A of (1R,5S)-1-(naphthalen-2-yl)-3-azabicyclo[3.1.0]hexane hydrochloride (20.0 g, 0.081 mol) was added to water (200.0 mL) under nitrogen atmosphere, and the mixture was stirred at 25° C. The mixture was cooled to 10° C. to precipitate a crystal, and then the precipitated crystal was filtered, washed with ethanol (10.0 mL), and dried at 40° C. to give a white solid (yield 76.02%, chemical purity 99.93%, optical purity 99.99% ee). The solid obtained after purification was measured for XRPD and confirmed to be crystalline form B.

INDUSTRIAL APPLICABILITY

The present invention allows for preparation of crystalline form A of (1R,5S)-1-(naphthalen-2-yl)-3-azabicyclo[3.1.0]hexane hydrochloride in a selective and stable manner with industrially easy operation.

The invention claimed is:

1. A process for preparing crystalline form A of (1R,5S)-1-(naphthalen-2-yl)-3-azabicyclo[3.1.0]hexane hydrochloride, wherein the process comprises:
   (a) heating and dissolving (1R,5S)-1-(naphthalen-2-yl)-3-azabicyclo[3.1.0]hexane hydrochloride in a solvent comprising an alcohol-based solvent;
   (b) cooling the dissolved product obtained in step (a) to a temperature, at which a crystal of (1R,5S)-1-(naphthalen-2-yl)-3-azabicyclo[3.1.0]hexane hydrochloride precipitates, to nucleate the crystal;
   (c) heating a mixture comprising the crystal obtained by nucleation to a temperature at which only a specific crystalline form of the crystal selectively remains in a solid state of the crystalline form, wherein the temperature is in a range of 65° C. to below a boiling point of the solvent; and
   (d) cooling the mixture heated in step (c) to obtain the crystalline form.

2. The process according to claim 1, wherein the temperature for heating in step (a) is a temperature exceeding 77° C.

3. The process according to claim 1, wherein the temperature in step (b) is in a range of 30° C. to 60° C.

4. The process according to claim 2, wherein the temperature in step (b) is in a range of 30° C. to 60° C.

5. The process according to claim 1, wherein the temperature in step (a) is in a range of greater than 77° C. to 82° C.

6. The process according to claim 5, wherein the temperature in step (a) is in a range of 79° C. to 82° C.

* * * * *